US009037182B2

United States Patent
Jeon

(10) Patent No.: US 9,037,182 B2
(45) Date of Patent: May 19, 2015

(54) APPARATUS AND METHOD FOR ADJUSTING TRANSMISSION POWER LEVEL OF A FEMTOCELL

(75) Inventor: Seung Woo Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 412 days.

(21) Appl. No.: 13/079,092

(22) Filed: Apr. 4, 2011

(65) Prior Publication Data

US 2012/0083272 A1 Apr. 5, 2012

(30) Foreign Application Priority Data

Oct. 1, 2010 (KR) .......................... 10-2010-0095790

(51) Int. Cl.
*H04B 7/00* (2006.01)
*H04W 52/24* (2009.01)

(52) U.S. Cl.
CPC .................................. *H04W 52/244* (2013.01)

(58) Field of Classification Search
None
See application file for complete search history.

(56) References Cited

U.S. PATENT DOCUMENTS

| 6,735,447 | B1 * | 5/2004 | Muller | 455/522 |
| 7,173,904 | B1 * | 2/2007 | Kim | 370/230 |
| 8,086,258 | B2 * | 12/2011 | Fujii et al. | 455/522 |
| 2004/0180686 | A1 * | 9/2004 | Nakayama | 455/522 |
| 2004/0203462 | A1 * | 10/2004 | Lin et al. | 455/67.13 |
| 2007/0225027 | A1 * | 9/2007 | Zhang | 455/522 |
| 2010/0130210 | A1 | 5/2010 | Tokgoz et al. | |
| 2010/0285795 | A1 * | 11/2010 | Whinnett | 455/424 |
| 2012/0129563 | A1 * | 5/2012 | Haas | 455/522 |

FOREIGN PATENT DOCUMENTS

| JP | 2010-004187 | 1/2010 |
| KR | 10-2010-0005374 | 2/2010 |
| KR | 10-2010-0016904 | 2/2010 |
| KR | 10-2010-0051855 | 5/2010 |

* cited by examiner

*Primary Examiner* — Fayyaz Alam
*Assistant Examiner* — Mohammed Rachedine
(74) *Attorney, Agent, or Firm* — NSIP Law

(57) ABSTRACT

An apparatus and method for setting a transmission power of a femtocell are provided. A range of a transmission power may be computed, and a minimum amount of power to be used by at least one communication terminal located within a cell coverage may be computed. Additionally, a suitable transmission power for communication may be determined using the computed range of the transmission power and the computed minimum amount of power.

20 Claims, 4 Drawing Sheets

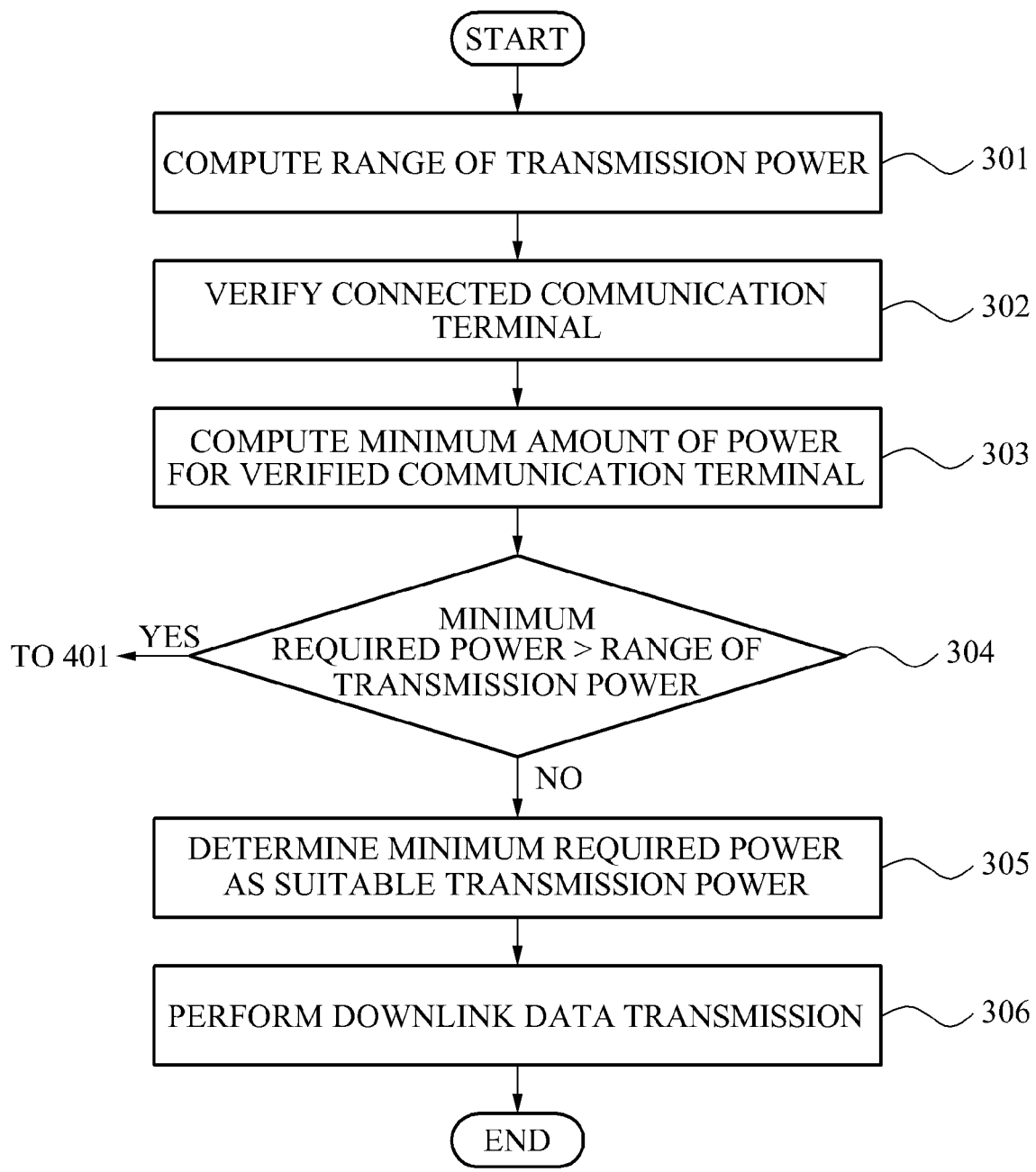

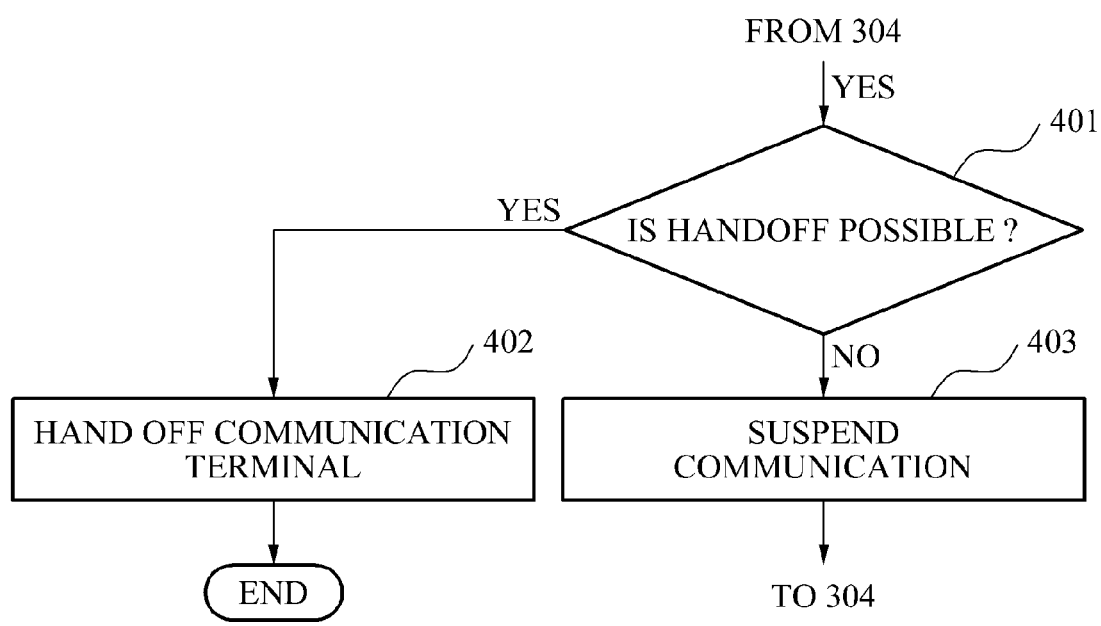

APPARATUS AND METHOD FOR ADJUSTING TRANSMISSION POWER LEVEL OF A FEMTOCELL

CROSS-REFERENCE TO RELATED APPLICATION(S)

This application claims the benefit under 35 U.S.C. §119 (a) of Korean Patent Application No. 10-2010-0095790, filed on Oct. 1, 2010, in the Korean Intellectual Property Office, the entire disclosure of which is incorporated herein by reference for all purposes.

BACKGROUND

1. Field

The following description relates to a technology of adaptively setting a transmission power of a femtocell in a mobile communication environment. More particularly, the following description relates to an apparatus and method for setting a transmission power of a femtocell that may maintain a Quality of Service (QoS) of a communication terminal as stably as possible when a transmission power is limited, and that may reduce energy consumption of a cell caused by setting a suitable transmission power.

2. Description of Related Art

A macrocell may provide a service over a relatively wide range. However, in the macrocell, it is difficult for an electromagnetic wave to reach an indoor space, such as a building or a house. As a result, there is a shadow area in which data is not effectively transmitted.

A femtocell refers to a compact base station that may be installed by a personal provider and a communication provider and that may support mobile communication service in a radius that is typically smaller than the coverage area of a macrocell. The femtocell may be installed in the shadow area of the macrocell, thereby supporting a smooth mobile communication service.

Because the femtocell may be connected directly to a core network using an ultra high-speed Internet connectable to an indoor space, the femtocell has an advantage of low installation and maintenance costs.

Additionally, the femtocell may use a significantly smaller amount of energy in order to maintain the same level of transmission power, compared with a macrocell.

Furthermore, prospects of femtocells are good, based on a rapid increase in a proportion of high-capacity data traffic of a terminal using a mobile terminal service, and based on supplies of channel resources required to provide services becoming more scarce.

In a current macrocell, it is difficult to use a high frequency for a stable bandwidth allocation. However, in a femtocell, it is possible to support a band of a high frequency while using low transmission power. Additionally, the femtocell may be expected to sufficiently and stably support channel resources, due to a relatively small number of terminals supported by each femtocell, for example, about five terminals.

The femtocell may be a critical equipment for a next-generation mobile communication network, and a usefulness of the femtocell may be expected to be sharply increased.

As a use of a femtocell is expected to rapidly increase, an interference between a femtocell and a macrocell, and interferences between different femtocells are emerging as important issues. Accordingly, to prevent the interferences, a transmission power of the femtocell may be set low. However, a reduction in power may cause problems such as a transmission radius to be reduced and a failure to satisfy a Quality of Service (QoS) required by a communication terminal.

SUMMARY

In one general aspect, there is provided a transmission power setting apparatus of a femtocell, the transmission power setting apparatus including a transmission power range computation unit to compute a range of transmission power, a minimum amount of power computation unit to compute a minimum amount of power to be used by at least one communication terminal located within a cell coverage, and a transmission power determination unit to determine a suitable transmission power for communication based on the computed range of the transmission power and the computed minimum amount of power to be used by at least one terminal.

The transmission power range computation unit may compute a range of the transmission power that is equal to or greater than a minimum permissible level and is equal to or less than a maximum permissible level, and the minimum permissible level may be set in advance based on a Quality Of Service (QoS), and the maximum permissible level may be set in advance based on interference.

The transmission power range computation unit may decrease the maximum permissible level, in response to receiving a request signal to adjust the range of the transmission power from at least one of a macrocell and another femtocell.

The minimum amount of power computation unit may compute at least one suitable data transmission rate for at least one communication terminal, and may compute the minimum amount of power to be used based on the computed at least one suitable data transmission rate.

The minimum amount of power computation unit may compute the minimum amount of power to be used based on a total bandwidth allocable to a downlink in the femtocell, a resource allocation ratio for the at least one communication terminal that is set in a frame start time, and an effective noise that reflects a channel environment between the femtocell and each of the at least one communication terminal.

The transmission power setting apparatus may further comprise a range determination unit to determine whether the computed minimum amount of power to be used exceeds the range of the transmission power.

The range determination unit may further determine whether the computed minimum amount of power to be used exceeds the range of the transmission power by a reference value, when the computed minimum amount of power to be used is determined to exceed the range of the transmission power, and transmission power setting apparatus may further comprise a controller to control a communication terminal from among the at least one communication terminals to be handed off to another cell, when the computed minimum amount of power to be used by the communication terminal is determined to exceed the range of the transmission power by the reference value.

The range determination unit may further determine whether the computed minimum amount of power to be used exceeds the range of the transmission power by a reference value, when the computed minimum amount of power to be used is determined to exceed the range of the transmission power, and transmission power setting apparatus may further comprise a controller to control an operation of a communication terminal from among the at least one communication terminals to be suspended for a predetermined period of time, when the computed minimum amount of power to be used by the communication terminal is determined to exceed the range of the transmission power by the reference value.

The minimum amount of power computation unit may determine a selected transmission power as the minimum amount of power to be used, when the at least one communication terminal communicates a non-real-time service.

The range of the transmission power may be determined to be equal to or greater than a minimum permissible level and to be equal to or less than a maximum permissible level, and the transmission power determination unit may determine the suitable transmission power, based on a maximum permissible level of the range of the transmission power and a maximum power value from among the computed minimum amount of power to be used by the at least one communication terminal.

The transmission power determination unit may determine, as the suitable transmission power, a power with a smaller value between the maximum power value and the maximum permissible level of the range of the transmission power.

In another aspect, there is provided a communication system, including at least one communication terminal, and a femtocell to communicate with the at least one communication terminal using a transmission power in a selected range, wherein the femtocell computes a minimum amount of power to be used for communication by the at least one communication terminal, and determines a suitable transmission power based on the computed minimum amount of power to be used and the selected range.

The femtocell may compare the minimum amount of power to be used with a maximum power value within the selected range, and may determine the maximum power value as the suitable transmission power when the minimum amount of power to be used exceeds the maximum power value.

The femtocell may compare the minimum amount of power to be used with a maximum power value within the selected range, and may determine the minimum amount of power to be used as the suitable transmission power when the maximum power value exceeds the minimum amount of power to be used.

The femtocell may compare the minimum amount of power to be used with a maximum power value within the selected range, and when the minimum amount of power to be used of a communication terminal exceeds the maximum power value by a reference value, the femtocell may control the communication terminal to be handed off to another cell, suspend a communication with the communication terminal for a predetermined period of time.

In another aspect, there is provided a transmission power setting method of a femtocell, the transmission power setting method including computing a range of a transmission power, computing a minimum amount of power to be used by at least one communication terminal located within a cell coverage, and determining a suitable transmission power for communication based on the computed range of the transmission power and the computed minimum amount of power to be used.

The method may further comprise determining whether the computed minimum amount of power to be used exceeds the range of the transmission power by a reference value, and handing off a communication terminal from among the at least one communication terminals to another cell, or suspending a communication with the communication terminal, when the computed minimum amount of power to be used by the communication terminal is determined to exceed the range of the transmission power by the reference value.

The range of the transmission power may be determined to be equal to or greater than a minimum permissible level and to be equal to or less than a maximum permissible level, and the determining may comprise determining the suitable transmission power, based on a maximum permissible level of the range of the transmission power and a maximum power value from among the computed minimum amount of power to be used by the at least one communication terminal.

In another aspect, there is provided a computer readable storage medium comprising program instructions to cause a processor to implement a transmission power setting method of a femtocell, the method including computing a range of a transmission power, computing a minimum amount of power to be used by at least one communication terminal located within a cell coverage, and determining a suitable transmission power for communication based on the computed range of the transmission power and the computed minimum amount of power to be used.

Other features and aspects may be apparent from the following detailed description, the drawings, and the claims.

BRIEF DESCRIPTION OF THE DRAWINGS

FIG. 3 is a flowchart illustrating an example of a transmission power setting method of a femtocell.

FIG. 4 is a flowchart illustrating another example of a transmission power setting method of a femtocell.

Figure 1:
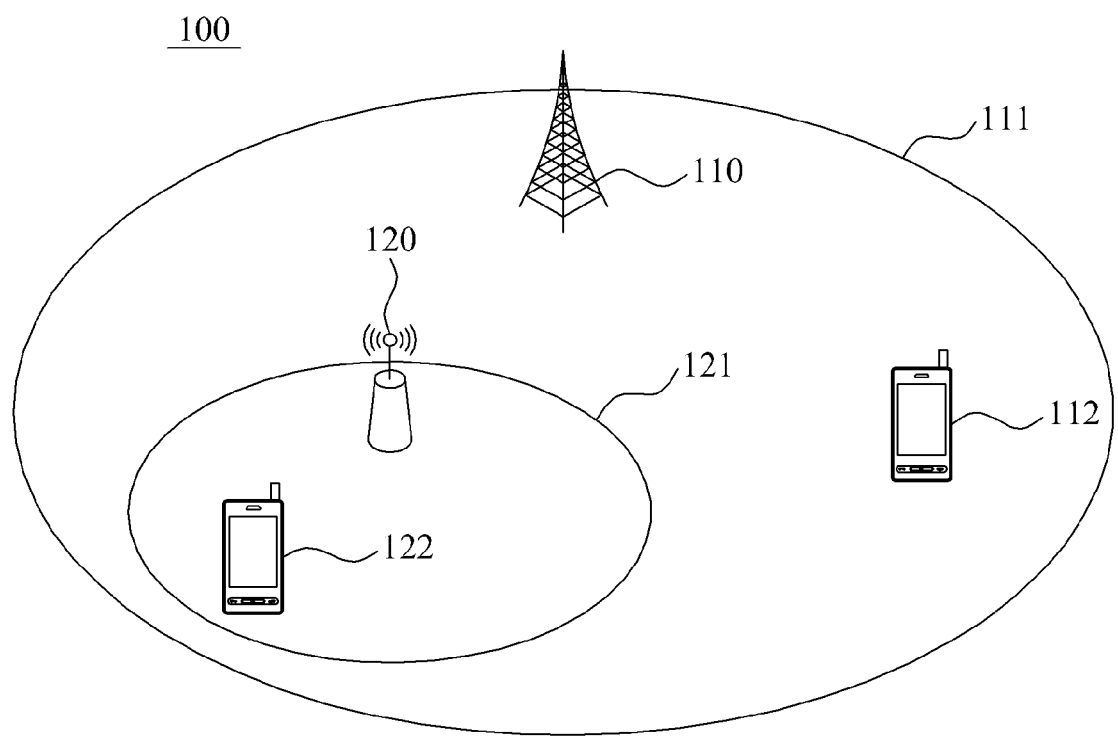
FIG. 1 is a diagram illustrating an example of a communication system including a femtocell.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

FIG. 1 illustrates a communication system 100 including a femtocell 120.

The communication system 100 may further include a macrocell 110 and a communication terminal 112. The communication terminal 112 may communicate with the macrocell 110 while within a cell coverage 111 of the macrocell 110.

To cover a shadowed area formed within the cell coverage 111, the communication system 100 may include the femtocell 120, and a communication terminal 122. The femtocell 120 may have a predetermined cell coverage 121, and the communication terminal 122 may perform communication through the femtocell 120 while within the shadow area.

The femtocell 120 may communicate with the communication terminal 122 using transmission power in a selected range. For example, the femtocell 120 may compute a minimum amount of power to be used for communication, and may determine a suitable transmission power based on the computed minimum amount of power and the selected range.

The femtocell 120 may set a transmission power as low as possible while in a power range of a permissible level, and may provide a communication service with a quality that is equal to or greater than a predetermined Quality of Service (QoS) to the communication terminal 122 located in the shadow area.

In other words, in order to avoid an interference with another femtocell or the macrocell 110, the femtocell 120 may not use a transmission power above a predetermined level. As another example, the femtocell 120 may also be installed in an indoor or outdoor area other than in the shadow area.

The femtocell 120 may detect a signal of the macrocell 110 and a signal of a neighboring femtocell. For example, the femtocell 120 may detect a signal of the macrocell 110 and a signal of a neighboring femtocell automatically after installation of the femtocell 120, and may prevent or reduce interference with a previously-installed cell.

Accordingly, the femtocell 120 may compute a range of a permissible transmission power in which interference may be prevented or reduced.

The femtocell 120 may compute, for each frame, a maximum permissible level $P_{Max}^i$ of a transmission power that will not interfere with neighboring cells, and a minimum permissible level $P_{Min}^i$ for smooth transmission of a data packet. In this example, i may denote the femtocell 120.

Accordingly, a transmission power $P_{Tx}^i(t)$ in a $t^{th}$ frame time may satisfy a condition, such as Equation 1.

$$P_{Tx}^i(t)=\{x|P_{Min}^i \le x \le P_{Max}^i\}$$ [Equation 1]

The femtocell 120 may set a range of a transmission power periodically for each frame. Accordingly, it is possible to prevent or reduce a Signal to Noise Ratio (SNR) of the communication terminal 112.

In response to an SNR of the communication terminal 112 connected to another cell, for example the macrocell 110, being reduced to less than a reference level, the other cell may send a request to adjust a transmission power to the femtocell, and the femtocell may reset the range of the transmission power in response to the request.

The femtocell 120 may verify the at least one connected communication terminal 122.

For example, the femtocell 120 may compute an intensity of power to satisfy a QoS of the connected communication terminal 122. That is, the femtocell 120 may compute a minimum amount of power to be used by the connected communication terminal 122.

The femtocell 120 may determine a suitable transmission power for communication, using the computed range of the transmission power and the computed minimum amount of power.

For example, in response to the minimum amount of power being in the range of the transmission power, the femtocell 120 may determine the minimum amount of power as a suitable transmission power for communication.

As another example, in response to the minimum amount of power exceeding the range of the transmission power, that is, in response to the minimum amount of power exceeding the maximum permissible level $P_{Max}^i$ by a threshold, the femtocell 120 may determine a degree by which the minimum amount of power exceeds the range of the transmission power.

For example, the femtocell 120 may determine that the degree at which the minimum amount of power exceeding the range of the transmission power has no influence on a communication QoS, and may determine the maximum permissible level $P_{Max}^i$, as the suitable transmission power.

As another example, in response to the minimum amount of power exceeding the range of the transmission power, and exceeding the maximum permissible level $P_{Max}^i$, the femtocell 120 may determine that the degree by which the minimum required power exceeding the range of the transmission power is influencing the QoS, and accordingly, may not continue to communicate with the communication terminal 122.

For example, the femtocell 120 may determine that the communication terminal 122 may perform communication using a significant amount of transmission power, and may control the communication terminal 122 to be handed off to the macrocell 110.

As another example, the femtocell 120 may suspend the communication for a selected period of time, instead of handing off the communication terminal 122 to the macrocell 110.

Data may be transmitted or received between a cell and a terminal for each frame. Accordingly, the femtocell 120 may suspend the communication with the communication terminal 122 for a single frame.

A plurality of communication terminals may communicate with a single cell.

For example, the femtocell 120 may compare the maximum permissible level with a largest power among a plurality of minimum amount of powers to be used by the plurality of communication terminals.

For example, the femtocell 120 may compare the minimum amount of power with the maximum power value within the selected range. In response to the minimum amount of power exceeding the maximum power value, the femtocell 120 may determine the maximum power value as the suitable transmission power.

Conversely, in response to the maximum power value exceeding the minimum amount of power, the femtocell 120 may determine the minimum amount of power as the suitable transmission power.

Additionally, in response to the minimum amount of power exceeding the maximum power value by a reference value, the femtocell 120 may control the communication terminal 122 to be handed off to another cell, or may control the communication with the communication terminal 122 to be suspended for a predetermined period of time.

Figure 2:
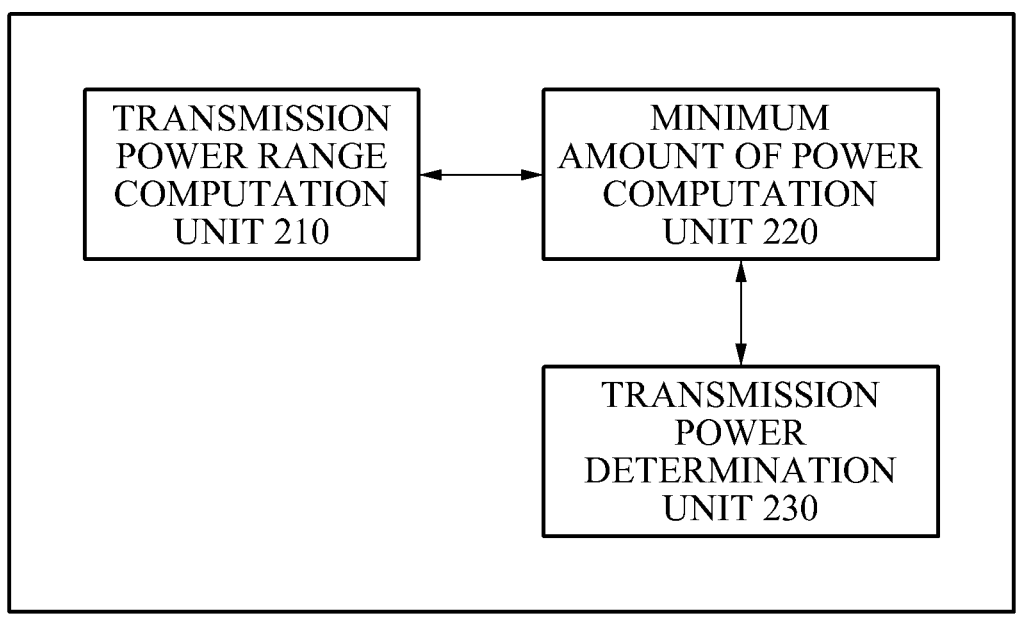
FIG. 2 is a diagram illustrating an example of a transmission power setting apparatus of a femtocell.

FIG. 2 illustrates a transmission power setting apparatus 200 of a femtocell.

The transmission power setting apparatus 200 of FIG. 2 includes a transmission power range computation unit 210, a minimum amount of power computation unit 220, and a transmission power determination unit 230.

The transmission power range computation unit 210 may compute a range of a transmission power of the femtocell. For example, the transmission power range computation unit 210 may compute the range of the transmission power using Equation 1. Additionally, the range of the transmission power may be automatically computed by an algorithm set in advance, once the femtocell is installed.

As an example, the transmission power range computation unit 210 may detect a signal of a macrocell and a signal of a neighboring femtocell, and may apply various schemes for preventing and/or reducing interference with a cell set in advance, to compute the range of the transmission power.

In response to a request signal to adjust the range of the transmission power being received from at least one of a macrocell and other femtocells, the transmission power range computation unit 210 may down-adjust, i.e., decrease, a maximum permissible level.

The minimum amount of power computation unit 220 may compute a minimum amount of power to be used by at least one communication terminal located within a cell coverage.

For example, the minimum amount of power computation unit 220 may verify a signal of the at least one communication terminal, and may distribute power resources based on a priority of each of the at least one communication terminal.

As another example, the femtocell may employ a "fixed power-time sharing" scheme of allocating resources to each terminal in a time-sharing manner and transmitting data using a same transmission power. Accordingly, embodiments may also be applied to other transmission power allocation schemes by appropriate modifications.

At least one communication terminal connected to the femtocell may use a real-time service or a non-real-time service.

The femtocell may allocate transmission resources to support each communication terminal based on a priority of services and a number of communication terminals currently connected to the femtocell.

In some embodiments, a scheme may be applied to preferentially support sufficient resources for the real-time service in advance to guarantee a QoS, and of appropriately allocating remaining resources to a terminal requiring the non-real-time service.

The real-time service may establish a suitable data transmission rate to guarantee a transmission delay and stable data reception. Additionally, the non-real-time service may include a best-effort service that may establish a minimum data transmission rate to smoothly provide services, for example a File Transfer Protocol (FTP), or may not establish a QoS requirement, for example an e-mail and a web browsing. These are only examples, and embodiments are not limited thereto.

In other words, the at least one communication terminal may communicate a non-real-time service, for example, a best-effort service, and the minimum amount of power computation unit 220 may determine a selected transmission power as the minimum amount of power.

The minimum amount of power computation unit 220 may compute a suitable data transmission rate of the at least one communication terminal, to compute the at least one minimum amount of power to be used by the at least one communication terminal in the cell coverage.

The minimum amount of power computation unit 220 may compute the minimum amount of power based on the computed suitable data transmission rate of the at least one communication terminal.

For example, the minimum amount of power computation unit 220 may compute the suitable data transmission rate of the at least one communication terminal, according to Equation 2, as below.

$$R_{min}^k = \tau_k B\log_2(1 + SNR_k^i)$$
$$= \tau_k B\log_2\left(1 + \frac{P_k(t)}{n_k B}\right)$$

[Equation 2]

Equation 2 may be used to represent a minimum or suitable data transmission rate R of a communication terminal k connected to a femtocell i, in accordance with Shannon's rule. In Equation 2, B may be defined as a total bandwidth of a total allocable downlink, and $\tau_k$ may be defined as a resource allocation ratio for the communication terminal k that is set in a frame start time. Additionally, $n_k$ may be defined as an effective noise reflecting a channel environment between the femtocell i and the communication terminal k. Resources may be quantitatively allocated to the communication terminal k at a predetermined ratio for each frame time based on a priority.

A minimum amount of power $P_k(t)$ of the communication terminal k may be computed based on Equation 2, according to Equation 3 below.

$$P_k(t) = n_k B\left(2^{\frac{R_{min}^k}{\tau_k B}} - 1\right)$$

[Equation 3]

The minimum amount of power computation unit 220 may compute the minimum amount of power to be used by at least one communication terminal connected within the cell coverage, according to Equations 2 and 3.

The transmission power determination unit 230 may determine a suitable transmission power for communication, using the computed range of the transmission power and the computed at least one minimum amount of power.

In response to the range of the transmission power of the femtocell being determined as equal to or greater than a minimum permissible level and as equal to or less than a maximum permissible level, the transmission power determination unit 230 may determine the suitable transmission power, based on a maximum permissible level of the range of the transmission power, and a maximum power value from among the computed at least one minimum amount of power to be used.

The transmission power determination unit 230 may determine, as the suitable transmission power, a power with a smaller value between the maximum power value and the maximum permissible level of the range of the transmission power.

The transmission power setting apparatus 200 may further include a range determination unit to determine whether the computed at least one minimum amount of power exceeds the range of the transmission power.

For example, in response to the computed at least one minimum amount of power being determined to exceed the range of the transmission power, the range determination unit may further determine whether the computed at least one minimum amount of power exceeds the range of the transmission power by a reference value.

As a result of the determining performed by the range determination unit, a communication terminal using a minimum amount of power exceeding the range of the transmission power by the reference value may be prevented from communicating with a current femtocell.

Accordingly, the transmission power setting apparatus 200 may further include a controller to control the communication terminal using the minimum amount of power exceeding the range of the transmission power by the reference value.

For example, the controller may control the communication terminal to be handed off to another cell, or may control an operation of the communication terminal to be suspended for a predetermined period of time.

In the communication terminal using the minimum amount of power exceeding the range of the transmission power by the reference value, it may be difficult to stably ensure an SNR, even when a maximum power is used by the femtocell. Additionally, the femtocell may suspend supporting of a service of a corresponding communication terminal, and may allocate a greater amount of resources to other terminals and accordingly, a side-effect of using a lower transmission power may be expected.

Thus, channel resources allocated in advance to terminals that do not reach the reference level may be collected, and the collected channel resources may be distributed to other communication terminals.

For example, in response to the range determination unit determining that a minimum amount of power exceeds the range of the transmission power, but does not exceed the range of the transmission power by the reference value, a degree by which the minimum required power exceeds the range of the transmission power may be determined to be insignificant, and the maximum permissible level may be determined as a suitable amount of power.

In other words, in a communication terminal using a minimum amount of power exceeding a level less than a predetermined range, support for a minimum data transmission rate may be expected even when a currently allowable maximum transmission power is used. Accordingly, $P_{Max}^{i}$ may be set as an amount of power of the communication terminal. In a best-effort service that does not define a requirement level, the minimum transmission power $P_{Min}^{i}$ may be set as a transmission power. The serial processes may be expressed according to the following Equation 4:

$$P_k(t) = P_k(t) \; \{P_k(t) < P_{max}^i \text{ or } (P_k(t) - P_{max}^i) < \alpha\} \quad \text{[Equation 4]}$$
$$= 0 \; (\text{Hand} - \text{off}/\text{Suspend}) \; \{P_k(t) - P_{max}^i > \alpha\}$$
$$= P_{min}^i \; \{\text{IF } k \text{ uses BE service}\}$$

For example, the femtocell i that acquires a minimum amount of power to be used by each of the at least one communication terminal may determine, as a suitable transmission power, a transmission power having a largest value from among computed values for target powers, without exceeding the transmission limit power, as follows, and may provide a service.

The transmission power determination unit 230 may determine, as the suitable transmission power, a power having a smaller value between the maximum power value and the maximum permissible level of the range of the transmission power.

Additionally, the femtocell may transmit data to the connected at least one communication terminal based on the determined suitable transmission power. In response to transmitting and receiving of the data to and from the at least one communication terminal being completed, the femtocell may repeat the above operation for each frame time, and may compute a suitable transmission power.

Therefore, according to embodiments, it may be possible to maintain a QoS of a communication terminal as stably as possible when a transmission power is limited in real-time, and to reduce energy consumption of a cell caused by setting a suitable transmission power.

Additionally, according to embodiments, it may be possible to efficiently use communication resources by distributing resources of a communication terminal where it is difficult to ensure an SNR to other communication terminals.

FIG. 3 illustrates an example of a method of setting a transmission power of a femtocell.

In 301, a range of the transmission power of the femtocell is computed.

In 302, a communication terminal connected within a cell coverage of the femtocell is verified. In 303, a minimum amount of power for the verified communication terminal is computed.

Communication terminals may communicate with the femtocell using their own minimum amount of power to satisfy a predetermined SNR, and the transmission power setting method of FIG. 3 may enable computation of magnitude of the minimum amount of power to be used each terminal.

In 304, whether the computed minimum amount of power exceeds the range of the transmission power is determined. For example, the range of the transmission power may be supported by the femtocell.

For example, in response to there being no communication terminal using a minimum amount of power exceeding the range of the transmission power, the computed minimum amount of power is determined as a suitable transmission power of the femtocell in 305, and a downlink data transmission to the communication terminal via the femtocell is performed in 306.

For example, in response to a plurality of communication terminals being connected to the femtocell, a greatest minimum amount of power from among the minimum amount of powers of the plurality of connected communication terminals may be determined as the suitable transmission power.

Accordingly, the femtocell may satisfy a QoS of all of the connected communication terminals.

In another example, in response to the computed minimum amount of power being determined to exceed the range of the transmission power in 304, but a degree by which the minimum amount of power exceeds the range of the transmission power does not exceed a reference value, it may be determined that a communication terminal using the minimum amount of power exceeding the range of the transmission power does not exist.

However, in this example, the minimum amount of power exceeding the range of the transmission power may be replaced with a maximum permissible level of the range of the transmission power.

In still another example, as a result of 304, in response to a minimum amount of power of a predetermined communication terminal among connected communication terminals exceeding a reference value, operations 401 through 403 of FIG. 4 may be performed.

FIG. 4 illustrates another example of the method of setting a transmission power of a femtocell.

In response to the minimum amount of power to be used by the predetermined communication terminal exceeding the reference value, whether a handoff of the predetermined communication terminal is possible is determined, in 401.

For example, in 401, the possibility or impossibility of the handoff of the predetermined communication terminal to a macrocell or another femtocell may be determined.

In response to the handoff being possible, the predetermined communication terminal is handed off to a cell enabling handoff, in 402.

Conversely, in response to the handoff not being possible, communication is suspended until a next frame, in 403, and the method may return to operation 304 of FIG. 3. In the next frame, the minimum amount of power of the predetermined communication terminal may be compared with the range of the transmission power.

The processes, functions, methods and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

According to embodiments, it may be possible to maintain a QoS of a communication terminal as stably as possible even when a transmission power is limited in real-time.

Additionally, according to embodiments, it may be possible to reduce energy consumption of a cell caused by setting a suitable transmission power.

Furthermore, according to embodiments, it may be possible to efficiently use communication resources by distributing resources of a communication terminal where it is difficult to ensure an SNR to other communication terminals.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A transmission power setting apparatus of a femtocell, the transmission power setting apparatus comprising:
    a transmission power range computation unit to compute a range of transmission power of the femtocell based on interference with a macrocell;
    a minimum amount of power computation unit to compute a minimum amount of power to be used by a communication terminal that is served by the femtocell; and
    a transmission power determination unit to determine a transmission power for communication by the communication terminal based on the computed range of the transmission power and the computed minimum amount of power, wherein
    the transmission power setting apparatus discontinues femtocell service for the communication terminal upon determining the minimum amount of power exceeds an established value.

2. The transmission power setting apparatus of claim 1, wherein:
    the range of the transmission power is equal to or greater than a minimum permissible level and is equal to or less than a maximum permissible level, and
    the minimum permissible level is set in advance based on a Quality Of Service (QoS), and
    the maximum permissible level is set in advance based on interference.

3. The transmission power setting apparatus of claim 2, wherein the transmission power range computation unit decreases the maximum permissible level, in response to receiving request signals to adjust the range of the transmission power from the macrocell and another femtocell.

4. The transmission power setting apparatus of claim 1, wherein the minimum amount of power computation unit computes a data transmission rate for the communication terminal and computes the minimum amount of power based on the computed data transmission rate.

5. A transmission power setting apparatus of a femtocell, the transmission power setting apparatus comprising:
    a transmission power range computation unit to compute a range of transmission power;
    a minimum amount of power computation unit to compute a minimum amount of power to be used by at least one communication terminal located within a cell coverage; and
    a transmission power determination unit to determine a suitable transmission power for communication based on the computed range of the transmission power and the computed minimum amount of power to be used by at least one terminal,
    wherein the minimum amount of power computation unit computes at least one suitable data transmission rate for at least one communication terminal, and computes the minimum amount of power to be used based on the computed at least one suitable data transmission rate, a total bandwidth allocable to a downlink in the femtocell, a resource allocation ratio for the at least one communication terminal that is set in a frame start time, and an effective noise that reflects a channel environment between the femtocell and each of the at least one communication terminal.

6. The transmission power setting apparatus of claim 1, further comprising a range determination unit to determine whether the computed minimum amount of power exceeds the range of the transmission power.

7. The transmission power setting apparatus of claim 6, wherein:
    the range determination unit further determines whether the computed minimum amount of power exceeds the range of the transmission power by a reference value, and
    the transmission power setting apparatus further comprises a controller to control the communication terminal to be handed off to another cell, when the computed minimum amount of power is determined to exceed the range of the transmission power by the reference value.

8. The transmission power setting apparatus of claim 6, wherein:
    the range determination unit further determines whether the computed minimum amount of power exceeds the range of the transmission power by a reference value, and
    the transmission power setting apparatus further comprises a controller to control an operation of the communication terminal to be suspended for a predetermined period of time, when the computed minimum amount of power is determined to exceed the range of the transmission power by the reference value.

9. The transmission power setting apparatus of claim 1, wherein the minimum amount of power computation unit determines a selected transmission power as the minimum amount of power, when the communication terminal communicates a non-real-time service.

10. The transmission power setting apparatus of claim 1, wherein:
the range of the transmission power is equal to or greater than a minimum permissible level and equal to or less than a maximum permissible level, and
the transmission power determination unit determines the transmission power based on the maximum permissible level of the range of the transmission power and a maximum power value.

11. The transmission power setting apparatus of claim 10, wherein the transmission power determination unit determines, as the transmission power, a power with a smaller value between the maximum power value and the maximum permissible level of the range of the transmission power.

12. A communication system comprising:
a communication terminal; and
a femtocell that serves the communication terminal in a cell coverage of the femtocell using a range of transmission power selected based on interference with a macrocell, wherein:
the femtocell computes a minimum amount of power to be used for communication by the communication terminal and determines a transmission power based on the computed minimum amount of power and the selected range of transmission power, and
the femtocell discontinues femtocell service for the communication terminal upon determining the minimum amount of power exceeds an established value.

13. The communication system of claim 12, wherein the femtocell compares the minimum amount of power to be used with a maximum power value within the selected range and determines the maximum power value as the transmission power when the minimum amount of power exceeds the maximum power value.

14. The communication system of claim 12, wherein the femtocell compares the minimum amount of power with a maximum power value within the selected range and determines the minimum amount of power as the transmission power when the maximum power value exceeds the minimum amount of power.

15. The communication system of claim 12, wherein:
the femtocell compares the minimum amount of power with a maximum power value within the selected range, and
when the minimum amount of power exceeds the maximum power value by a reference value, the femtocell controls the communication terminal to be handed off to another cell or suspends communication with the communication terminal for a predetermined period of time.

16. A transmission power setting method executed by a femtocell, the method comprising:
computing a range of transmission power of the femtocell based on interference with a macrocell;
computing a minimum amount of power to be used by a communication terminal that is served by the femtocell;
determining a transmission power for communication by the communication terminal based on the computed range of the transmission power and the computed minimum amount of power; and
discontinuing femtocell service for the communication terminal upon determining the minimum amount of power exceeds an established value.

17. The transmission power setting method of claim 16, further comprising:
determining whether the computed minimum amount of power exceeds the range of the transmission power by a reference value; and
handing off the communication terminal to another cell or suspending communication with the communication terminal, when the computed minimum amount of power is determined to exceed the range of the transmission power by the reference value.

18. The transmission power setting method of claim 16, wherein:
the range of the transmission power is equal to or greater than a minimum permissible level and equal to or less than a maximum permissible level, and
the transmission power is determined based on the maximum permissible level of the range of the transmission power and a maximum power value.

19. A non-transitory computer readable storage medium comprising program instructions to cause a processor to implement a transmission power setting method executed by a femtocell, the method comprising:
computing a range of transmission power of the femtocell based on interference with a macrocell;
computing a minimum amount of power to be used by a communication terminal that is served by the femtocell;
determining a transmission power for communication by the communication terminal based on the computed range of the transmission power and the computed minimum amount of power; and
discontinuing femtocell service for the communication terminal upon determining the minimum amount of power exceeds an established value.

20. The transmission power setting apparatus of claim 1, wherein in response to the minimum amount of power exceeding the range of transmission power, the transmission power determination unit determines whether a maximum transmission power, from among the range of transmission power, is the transmission power based on a degree at which the minimum amount of power exceeds the maximum transmission power.

* * * * *